(12) United States Patent
Ikeuchi

(10) Patent No.: US 9,386,193 B2
(45) Date of Patent: Jul. 5, 2016

(54) SIGNAL TRANSMITTING DEVICE, SIGNAL TRANSMITTING/RECEIVING DEVICE, AND IMAGE DISPLAY DEVICE

(71) Applicant: Panasonic Intellectual Property Management Co., Ltd., Osaka (JP)

(72) Inventor: Nobuo Ikeuchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/887,112

(22) Filed: Oct. 19, 2015

(65) Prior Publication Data

US 2016/0127615 A1    May 5, 2016

(30) Foreign Application Priority Data

Oct. 31, 2014  (JP) .................................. 2014-222390
Sep. 7, 2015   (JP) .................................. 2015-175279

(51) Int. Cl.
*H04N 5/06*   (2006.01)
*H04N 5/38*   (2006.01)
*H04N 5/067*  (2006.01)

(52) U.S. Cl.
CPC . *H04N 5/067* (2013.01); *H04N 5/38* (2013.01)

(58) Field of Classification Search
CPC .......... H04N 21/4382; H04N 21/4305; H04N 21/2383; H04N 9/1379; H04N 5/06; H04N 5/067; H04N 5/0675; H04N 5/38; H04N 5/4401; H04N 9/45; H04N 9/455; H04N 5/44
USPC .............. 348/521, 723–725, 488; 375/240.28
See application file for complete search history.

(56) References Cited

U.S. PATENT DOCUMENTS

2012/0050611 A1   3/2012  Sontag et al.
2012/0147976 A1*  6/2012  Ries ....................... G09G 5/006
                                                        375/240.28

FOREIGN PATENT DOCUMENTS

JP       2012-054924        3/2012

* cited by examiner

*Primary Examiner* — Sherrie Hsia
(74) *Attorney, Agent, or Firm* — McDermott Will & Emery LLP

(57) ABSTRACT

The signal transmitting device of a signal transmitting/receiving device according to the present disclosure includes a signal processing unit that outputs a video signal as parallel data together with the first clock (the pixel clock); a first buffer memory to which the parallel data is written based on the first clock from the signal processing unit, and from which the written parallel data is read based on the second clock having a constant frequency equal to or higher than that of the first clock; and a transmitting unit. The transmitting unit receives the parallel data read from the first buffer memory and the second clock, converts the parallel data into serial data, and outputs the serial data to the signal line based on the second clock. The first buffer memory and the transmitting unit are formed of an FPGA (field-programmable gate array).

6 Claims, 4 Drawing Sheets

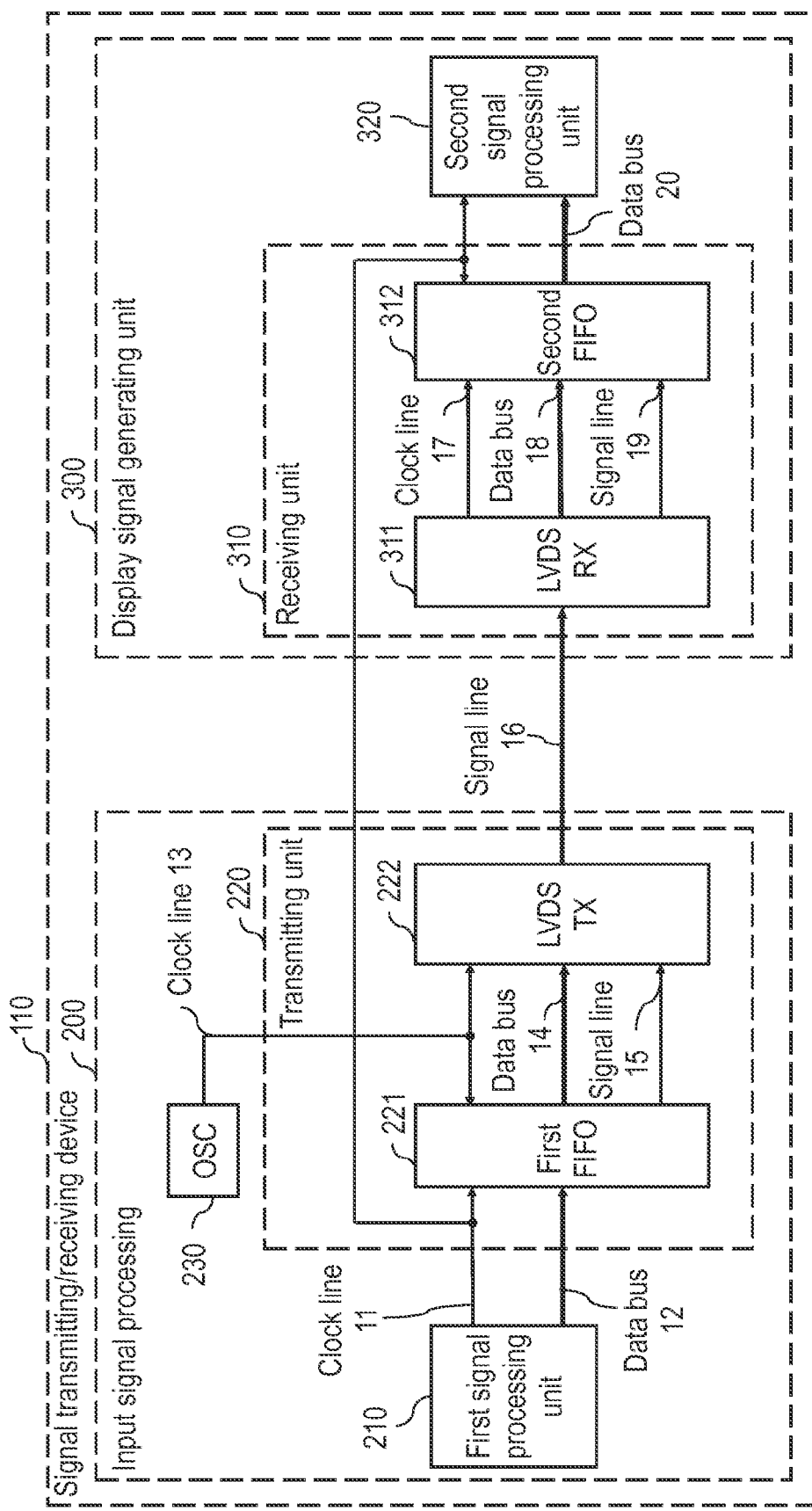

SIGNAL TRANSMITTING DEVICE, SIGNAL TRANSMITTING/RECEIVING DEVICE, AND IMAGE DISPLAY DEVICE

BACKGROUND

1. Technical Field

The present disclosure relates to a signal transmitting/receiving device for transmitting and receiving video signals between other devices.

2. Description of the Related Art

PTL 1 discloses a system for transmitting and receiving video digital signals of low-voltage differential signaling (LVDS) type.

CITATION LIST

Patent Literature

PTL 1 Japanese Patent Unexamined Publication No. 2012-54924

SUMMARY

The present disclosure provides a signal transmitting/receiving device that eliminates the need for reconfiguring a field-programmable gate array (FPGA) forming the signal transmitting/receiving device even if the frequency of the pixel clock of a video signal to be input changes.

The signal transmitting device of a signal transmitting/receiving device according to the present disclosure includes a signal processing unit that outputs a video signal as parallel data together with the first clock (the pixel clock); a first buffer memory to which the parallel data is written based on the first clock from the signal processing unit, and from which the written parallel data is read based on the second clock having a constant frequency equal to or higher than that of the first clock; and a transmitting unit. The transmitting unit receives the parallel data read from the first buffer memory and the second clock, converts the parallel data into serial data, and outputs the serial data to the signal line based on the second clock. The first buffer memory and the transmitting unit are formed of an FPGA (field-programmable gate array).

The present disclosure eliminates the need for reconfiguring the FPGA forming a signal transmitting/receiving device even if the frequency of the pixel clock of a video signal to be input changes.

BRIEF DESCRIPTION OF DRAWINGS

FIG. 2 illustrates the configuration of a signal transmitting/receiving device according to the embodiment.

DETAILED DESCRIPTION OF THE PREFERRED EMBODIMENTS

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure and are not intended to limit the subjects described in the claims.

Exemplary Embodiment

Hereinafter, a description is made of an exemplary embodiment in which a signal transmitting/receiving device of the present disclosure has been applied to an image display device such as an liquid crystal display device using FIGS. 1 through 4.

[Configuration]

Figure 1:
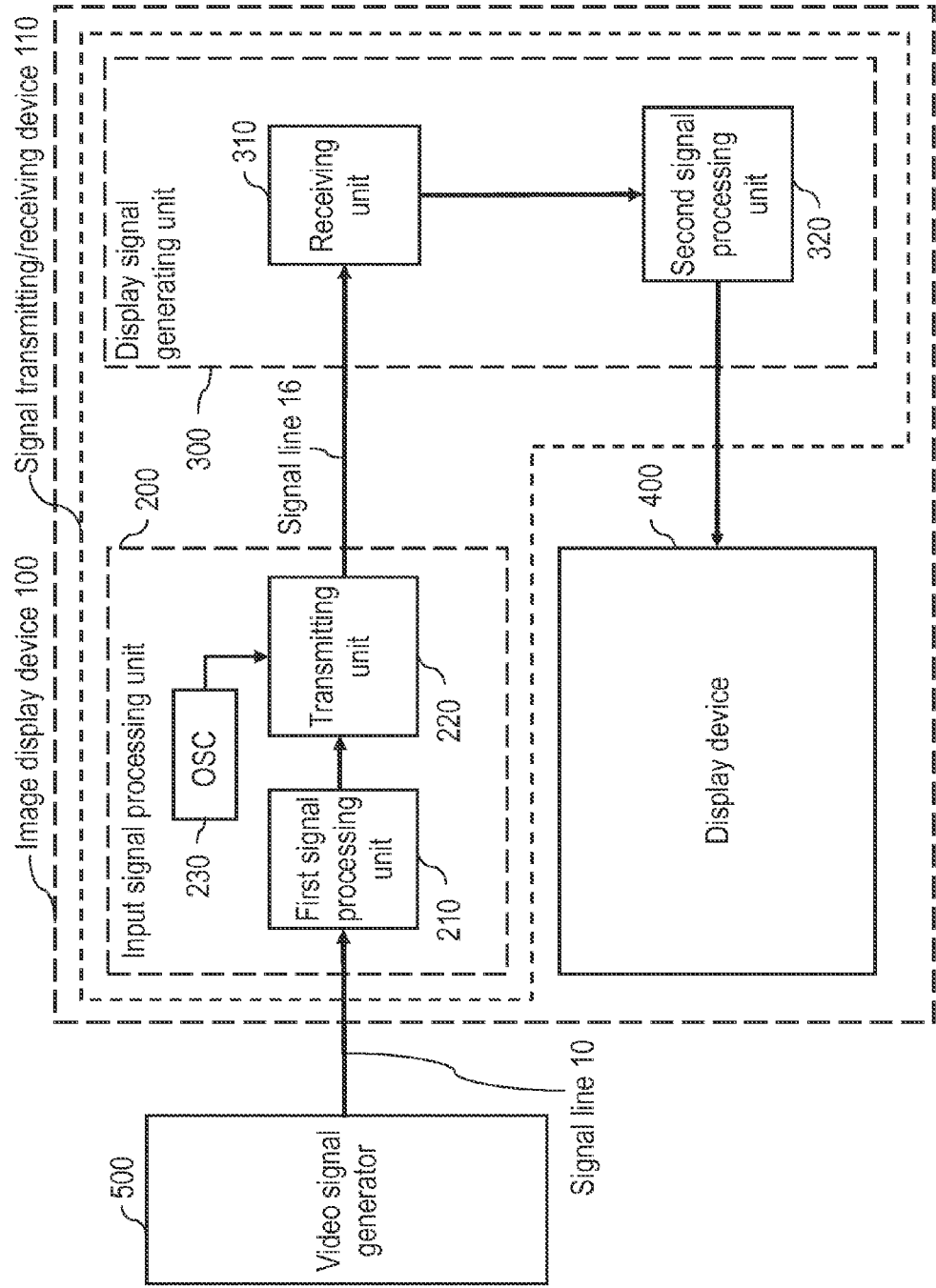
FIG. 1 is an overview of an image display device according to an exemplary embodiment.

FIG. 1 is a block diagram illustrating image display device 100 and video signal generator 500 supplying video signals displayed on image display device 100.

Video signal generator 500 supplies video signals for a personal computer and a DVD player for example. Image display device 100 contains input signal processing unit 200 to which an input video signal from video signal generator 500 is supplied; display signal generating unit 300 that receives a signal output from input signal processing unit 200 to generate a signal for display; and display device 400 that displays the signal from display signal generating unit 300. Here, input signal processing unit 200 is an example of a signal transmitting device, and display signal generating unit 300 is an example of a signal receiving device. Input signal processing unit 200 and display signal generating unit 300 compose signal transmitting/receiving device 110.

Input signal processing unit 200 includes first signal processing unit 210 to which a video signal from video signal generator 500 is supplied through signal line 10 (e.g., a BNC coaxial cable) and through an input terminal (unillustrated) to which this signal line is connected; transmitting unit 220 that receives a signal from first signal processing unit 210, converts the signal to an LVSD signal, and transmits the LVSD signal; and oscillator (OSC: clock generator) 230 that supplies a clock signal with a constant frequency to this transmitting unit 220.

Display signal generating unit 300 includes receiving unit 310 that converts an LVDS signal from transmitting unit 220 to its original signal and outputs it and second signal processing unit 320 that receives output from receiving unit 310 to generate a display signal to be supplied to display device 400.

FIG. 2 is a detailed block diagram of the substantial parts of input signal processing unit 200 and display signal generating unit 300. Transmitting unit 220 is composed of first FIFO (first in first out) buffer memory (referred to as first FIFO hereinafter) 221 and LVDS (low voltage differential signaling) transmitter (LVDSTX) 222, both formed of an FPGA (field-programmable gate array). Receiving unit 310 is composed of LVDS receiver (LVDSRX) 311 and second FIFO buffer memory (referred to as second FIFO hereinafter) 312, both formed of an FPGA. LVDS transmitter 222 is an example of a transmitting unit, and LVDS receiver 311 is an example of a receiver.

[Operation]

Figure 3A:
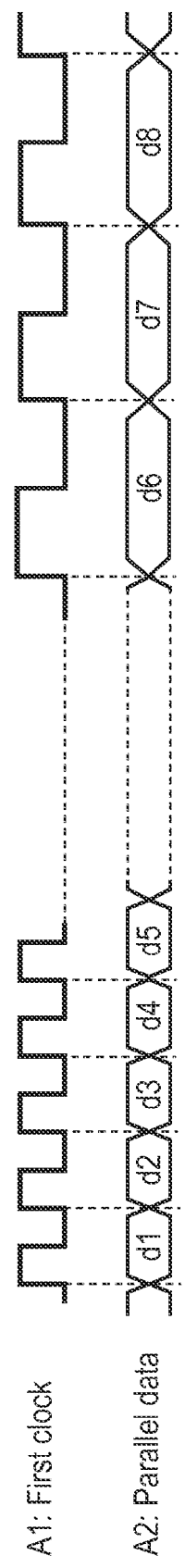
FIGS. 3A and 3B are timing charts illustrating operation of the signal transmitting/receiving device according to the embodiment.
Figure 3B:
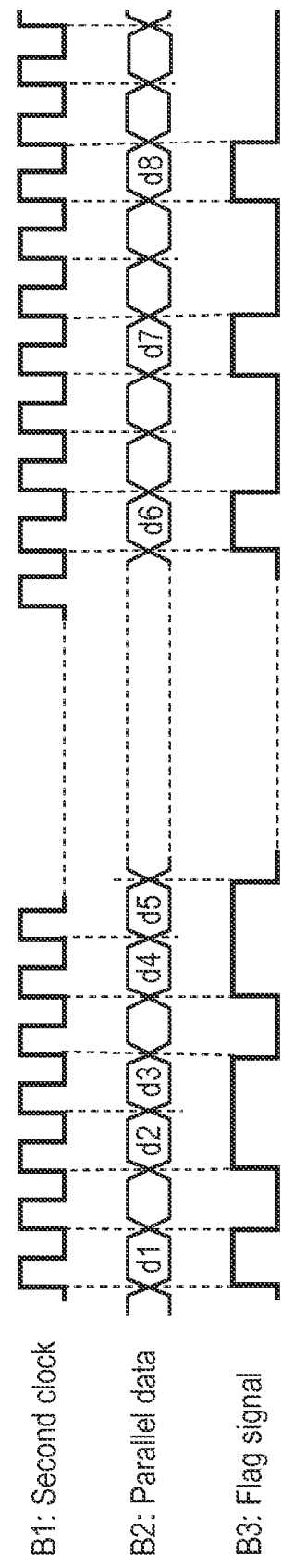
Figure 4:
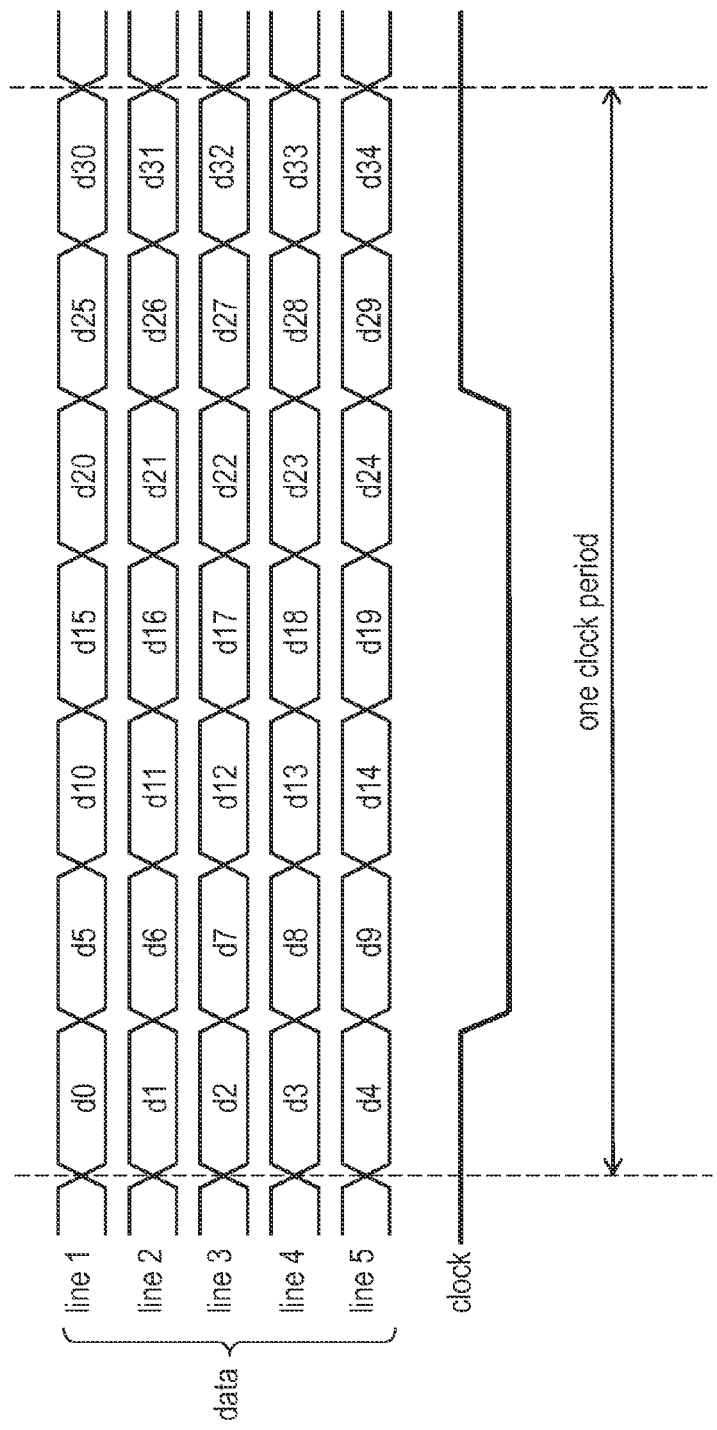
FIG. 4 illustrates data streams in a format of LVDS 7:1.

Next, a description is made of operation of signal transmitting/receiving device 110 according to this embodiment shown in FIGS. 1 and 2 with reference to FIGS. 3A, 3B, and 4.

As shown in FIG. 1, a video signal output from video signal generator 500 is supplied as serial-format video data to the input terminal of image display device 100 through signal line 10. The video data supplied to the input terminal is supplied to first signal processing unit 210.

First signal processing unit 210 converts the input data to a format used in the image signal display device. More specifically, as shown in FIG. 2, first signal processing unit 210 converts video data (serial data) to parallel-format data and outputs the data to data bus 12, while outputting the pixel clock (the first clock) for the video signal to clock line 11. As shown in FIG. 2, this pixel clock is supplied to first FIFO 221 and at the same time to second FIFO 312 and second signal processing unit 320.

The waveform shown by A1 in FIG. 3A represents the pixel clock (the first clock) output from first signal processing unit 210. The waveform shown by A2 in FIG. 3A represents N bits of parallel data output from first signal processing unit 210. As shown in FIG. 3A, the parallel data output from first signal processing unit 210 is written to first FIFO 221 at a rising edge of the pixel clock.

Oscillator 230 generates a clock (the second clock) with a constant frequency equal to or higher than that of the pixel clock output from first signal processing unit 210. The waveform shown by B1 in FIG. 3B represents a second clock output from oscillator 230. This second clock is supplied to first FIFO 221 through clock line 13. The parallel data written to first FIFO 221 is read at a rising edge of the second clock and is output to data bus 14.

The waveform shown by B2 in FIG. 3B represents parallel data that is read from first FIFO 221 based on the second clock and is supplied to LVDS transmitter 222 through data bus 14. In this way, parallel data output from first signal processing unit 210 is transferred by first FIFO 221 from the first clock to the second clock.

From first FIFO 221, a flag signal is output to signal line 15 shown in FIG. 2, and this signal is supplied to LVDS transmitter 222. This flag signal represents a timing of reading data from first FIFO 221 like the waveform shown by B3 in FIG. 3B, where the signal is high when data d1, d2, d3, . . . are present. Accordingly, at a timing when data read from first FIFO 221 is not present, the flag signal is low.

When LVDS transmitter 222 receives parallel data and a flag signal from first FIFO 221, and the second clock from oscillator 230, LVDS transmitter 222 converts these to serial signals in a format of LVDS 7:1 and outputs the serial signals to signal line 16.

FIG. 4 shows a signal in a format of LVDS 7:1. This transmission system based on an LVDS signal is widely used for transmitting and receiving data between devices in digital audiovisual equipment, where one video channel is composed of five LVDS data lines and one LVDS clock line. Each of data lines 1 to 5 transmits serial data d0, d1, d3, . . . , and d34 produced by being multiplied by 7 for one clock period. At this moment, the data of a flag signal supplied from first FIFO 221 is added into an empty area in a data bus width of one clock cycle of 35 bits in a format of LVDS 7:1. Note that FIGS. 1 and 2 show five LVDS data lines and one LVDS clock line as signal line 16 for convenience.

Image display device 100 needs to receive a signal from outside video signal generator 500 to the input terminal, to convert the signal format to that for transmission inside image display device 100, and to transmit the converted signal to display signal generating unit 300 in order to supply the signal to display device 400. Typically for large-screen image display device 100, the position where the input terminal is placed may be separated from display signal generating unit 300 by several tens of centimeters. Accordingly, in order to reduce the number of signal lines and to improve the signal quality, a signal is serially transmitted using a format of LVDS 7:1 in the present disclosure.

A signal in a format of LVDS 7:1 output from LVDS transmitter 222 is supplied to LVDS receiver 311. When receiving the signal, LVDS receiver 311 converts the serial data in a format of LVDS 7:1 to parallel data and outputs the signal together with a clock and a flag signal. More specifically, LVDS receiver 311 reproduces a second clock, parallel data, and a flag signal so that they are the same as those to be input to LVDS transmitter 222, and outputs the second clock to clock line 17; the parallel data, to data bus 18; and the flag signal, to signal line 19.

To the write-enable terminal of second FIFO 312, the data of a flag signal is supplied, where the data is to be written at a rising edge of the clock when the write-enable terminal is high. Accordingly, only valid data of parallel data output from LVDS receiver 311 is to be written to second FIFO 312 at a rising edge of the second clock.

The parallel data written to second FIFO 312 is read based on the first clock (i.e., the pixel clock) and is output to data bus 20. The data of the video signal that has undergone transfer of the clock again is supplied from second FIFO 312 to second signal processing unit 320 as data synchronized with the first clock.

Second signal processing unit 320 performs a process for generating video display data based on the first clock and on the data of a video signal that are input, and supplies the video display data to display device 400 as shown in FIG. 1. In this embodiment, display device 400 is a liquid crystal display panel, on which images are displayed.

[Advantageous Effect]

In a case where the LVDS transmitter and the LVDS receiver are formed of an FPGA, the pixel clock used for a clock for transmission requires reconfiguration of the FPGA when the frequency of the pixel clock changes dynamically.

In this embodiment, when a signal in a format of LVDS 7:1 is transmitted, the signal is transferred from the pixel clock to the second clock with a constant frequency to be used for a transmission clock, and thus reconfiguration of the FPGA is not required even if the frequency of the pixel clock changes dynamically. Accordingly, the image format can be changed seamlessly even if the frequency of the pixel clock changes dynamically. Further, configuration data is not required for every frequency of the pixel clock, which reduces the capacity of the configuration ROM of the FPGA and eliminates the need for external control on the FPGA for reconfiguration. This reduces the circuit size of the entire system and greatly contributes to cost reduction.

Another Exemplary Embodiment

In the above-described embodiment, first FIFO 221 and LVDS transmitter 222 are formed of a single FPGA. However, oscillator 230 and first signal processing unit 210, together with first FIFO 221 and LVDS transmitter 222, may be formed of a single FPGA. In the above-described embodiment, LVDS receiver 311 and second FIFO 312 are formed of a single FPGA. However, second signal processing unit 320, together with LVDS receiver 311 and second FIFO 312, may be formed of a single FPGA.

Hereinbefore, the exemplary embodiments are described to exemplify the technology disclosed in this patent application. The technology of the disclosure, however, is not limited to these embodiments, but is applicable to other embodiments devised through modification, substitution, addition, omission for example. Further, some components described in the exemplary embodiments can be combined to create a new embodiment.

INDUSTRIAL APPLICABILITY

The present disclosure is applicable to a transmitter formed of an FPGA, a signal transmitting/receiving device including a receiver, and an image display device using the signal transmitting/receiving device.

What is claimed is:

1. A signal transmitting device comprising:
   a signal processing unit that outputs a video signal in a form of parallel data along with a first clock as a pixel clock;
   a first buffer memory to which the parallel data is written based on the first clock from the signal processing unit, and from which the written parallel data is read based on a second clock having a constant frequency equal to or higher than that of the first clock; and
   a transmitting unit that receives the parallel data read from the first buffer memory and the second clock, converts the parallel data into serial data, and outputs the serial data to a signal line based on the second clock, wherein the first buffer memory and the transmitting unit are formed of an FPGA (field-programmable gate array).

2. The signal transmitting device of claim 1, further comprising a clock generator generating the second clock, wherein the first buffer memory, the transmitting unit, and the clock generator are formed of an FPGA.

3. The signal transmitting device of claim 1, wherein the signal processing unit, the first buffer memory, and the transmitting unit are formed of an FPGA.

4. A signal transmitting/receiving device comprising a signal transmitting device of claim 1 and a signal receiving device, wherein the signal receiving device includes:
   a receiver that receives serial data from the transmitting unit together with the second clock through the signal line, converts the serial data to the parallel data, and outputs the parallel data together with the second clock; and
   a second buffer memory to which the parallel data is written based on the second clock, and from which the written parallel data is read based on the first clock, and wherein the second buffer memory and the receiver are formed of an FPGA.

5. The signal transmitting/receiving device of claim 4,
   wherein the first buffer memory and the second buffer memory are FIFO (first in first out) memories, and
   wherein the transmitting unit transmits an LVDS (low voltage differential signaling) signal to the receiver.

6. An image display device comprising the signal transmitting/receiving device of claim 4 and a display device.

* * * * *